Figure 1:
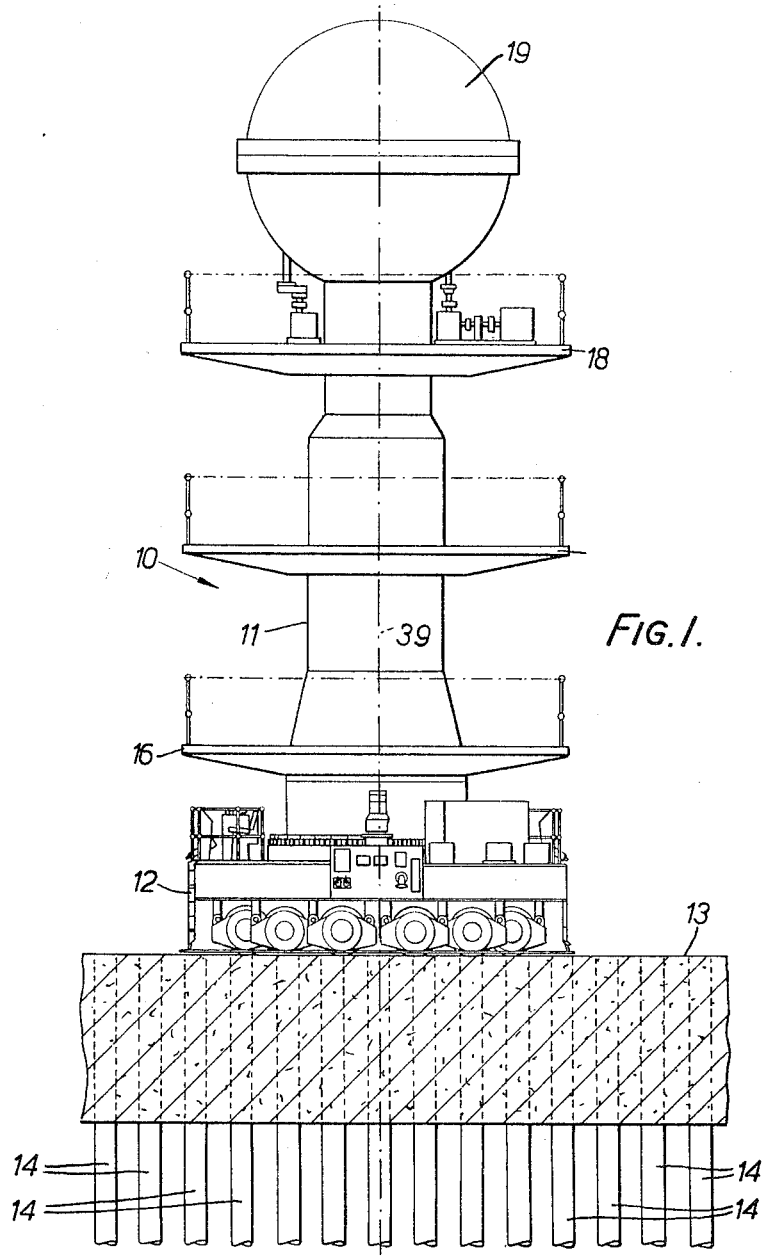

Nov. 1, 1966  A. J. MAISEY  3,282,044
HOISTING CHAINS

Filed Aug. 28, 1964  5 Sheets-Sheet 1

INVENTOR
ALBERT J. MAISEY
BY
Watson, Cole, Grindle & Watson
ATTORNEYS

Nov. 1, 1966       A. J. MAISEY       3,282,044
                    HOISTING CHAINS
Filed Aug. 28, 1964                 5 Sheets-Sheet 4

INVENTOR
ALBERT J. MAISEY

BY
Watson, Cole, Grindle & Watson

ATTORNEYS

Nov. 1, 1966    A. J. MAISEY    3,282,044
HOISTING CHAINS
Filed Aug. 28, 1964    5 Sheets-Sheet 5
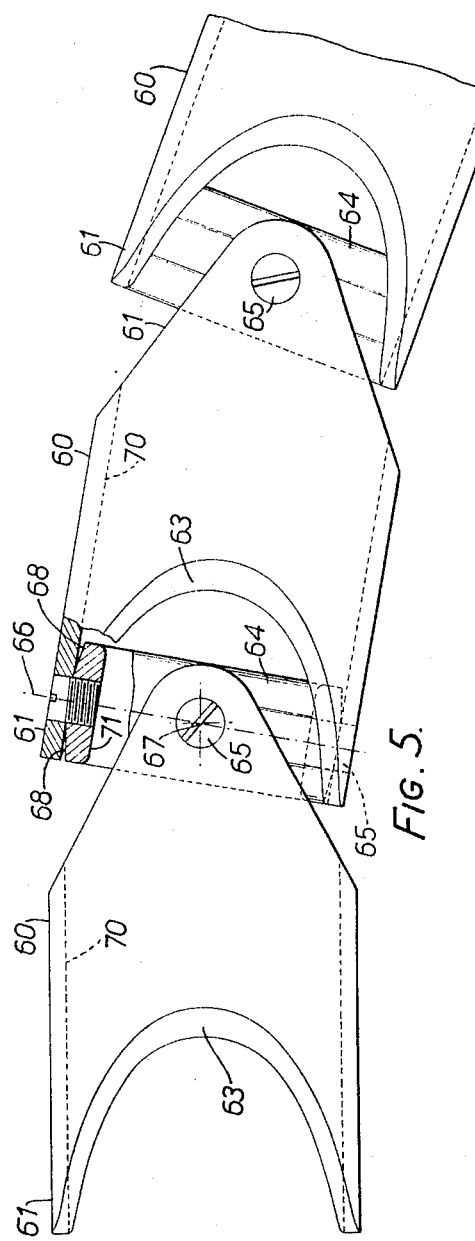
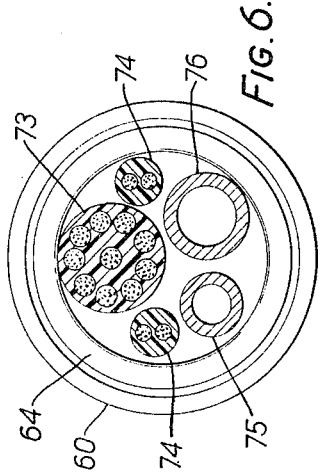
INVENTOR
ALBERT J. MAISEY
BY
Watson, Cole, Grindle & Watson
ATTORNEYS United States Patent Office 3,282,044
Patented Nov. 1, 1966

3,282,044
HOISTING CHAINS
Albert J. Maisey, Heston, Middlesex, England, assignor to Fairey Engineering Limited, Heston, Middlesex, England, a company of Great Britain
Filed Aug. 28, 1964, Ser. No. 392,956
Claims priority, application Great Britain, Aug. 30, 1963, 34,483/63
5 Claims. (Cl. 59—78.1)

This invention relates to articulated chains for use in hoists, and is concerned with providing a chain of generally tubular construction having a central passage extending throughout the length of the chain. This central passage can be used to house flexible electric leads and/or flexible pneumatic or hydraulic pipelines.

According to one aspect of the present invention, an articulated chain is formed of a series of rigid open-ended tubular links pivotally interconnected in alignment with one another by means of universal joint connections which permit each link to pivot through a limited angle relatively to the adjacent link about two transverse pivotal axes, there being a continuous internal passage through the chain from end to end.

According to a further feature of the invention a plurality of flexible service leads, for example electric leads and/or cables, hydraulic and/or pneumatic pipes, and/or flexible mechanical drives, extend through the central passage formed by the bores of the aligned tubular links, which protect the service leads from damage, for example from being crushed when the chain is wound under tension on a winch drum.

In one construction of chain embodying the invention, each link comprises a short open-ended length of rigid tube, for example of cylindrical shape, which is formed at each end with two axially-protruding tapering nose portions extending as continuations of its side wall on diametrically-opposite sides thereof, the protruding nose portions at each end being separated by corresponding re-entrant bays formed in intervening diametrically-opposite parts of the side wall, and the two pairs of nose portions at the opposite ends of each link being angularly displaced by 90° with respect to one another around the longitudinal axis of the link, and adjacent ends of adjacent links being coupled together with the noses of one protruding into the re-entrant bays of the other by means of a gimbal ring to which the oppositely-directed noses of the two links are pivoted about transverse axes at right angles to one another.

According to another of its aspects the invention comprises a hoist having a power-driven winding drum on which is wound an articulated hoisting chain of the construction referred to above, a plurality of electric service leads, such as electric leads and/or cables, hydraulic and/or pneumatic pipes, and/or flexible mechanical drives, extending through the central passage formed in the chain by the aligned bores of the tubular links.

The invention according to yet another of its aspects comprises a fuelling machine for servicing vertical fuel and control channels in the core of a power-generating nuclear reactor, the fuelling machine including at least one power-driven hoist having a winding drum on which is wound an articulated hoisting chain of the construction referred to above, a plurality of electric service leads, such as electric leads and/or cables, hydraulic and/or pneumatic pipes, and/or flexible mechanical drives, extending through the central passage formed in the chain by the aligned bores of the tubular links, the fuelling machine being adapted to insert and remove a fuel element, control rod or other load into or from a selected channel of the reactor core by means of the hoist by whose articulated hoisting chain the load is suspended.

The flexible service leads extending through the central passage in the hoisting chain may service a variety of different facilities in the vicinity of the load; for example they may include electric leads extending to thermocouples, a multi-core electric cable attached to a television camera to be lowered into a channel for inspection purposes, a hydraulic pipe line or electric supply leads to drive a hydraulic or electric motor associated with the load, for example to actuate a grab, a flexible mechanical drive to drive a grab mechanism or other facility associated with the load, and/or a pneumatic pipe line to supply cooling gas or compressed gas to drive a motor.

Figure 2:
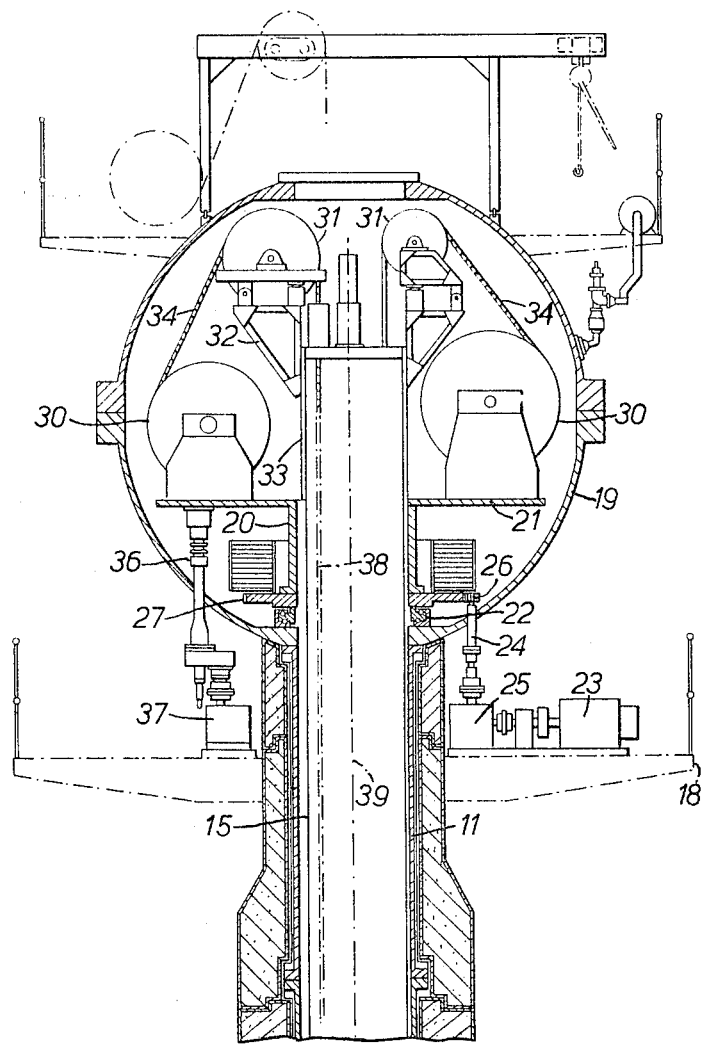
Figure 3:
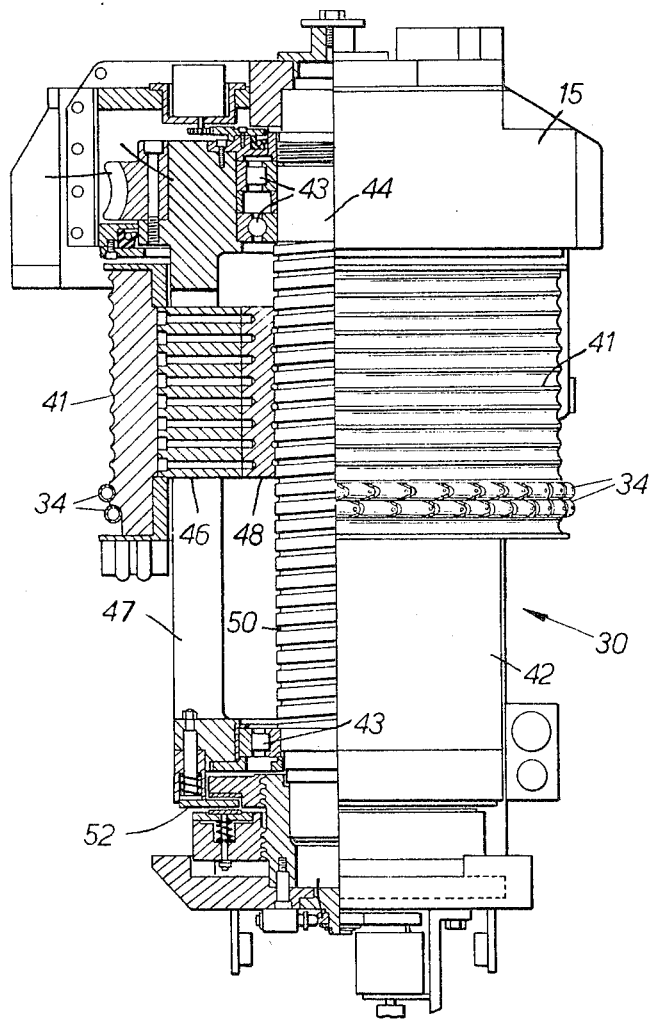
Figure 4:
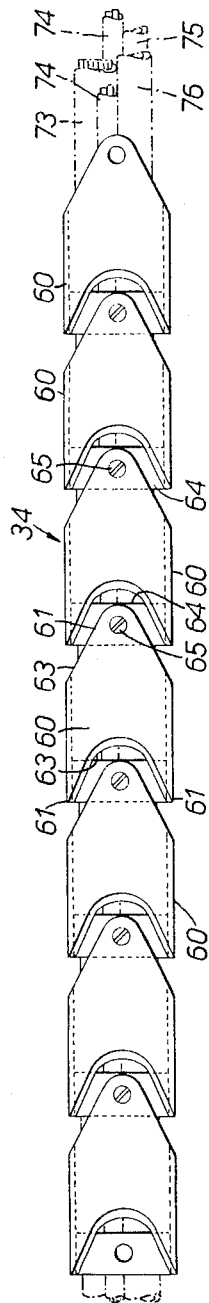
Figure 7:
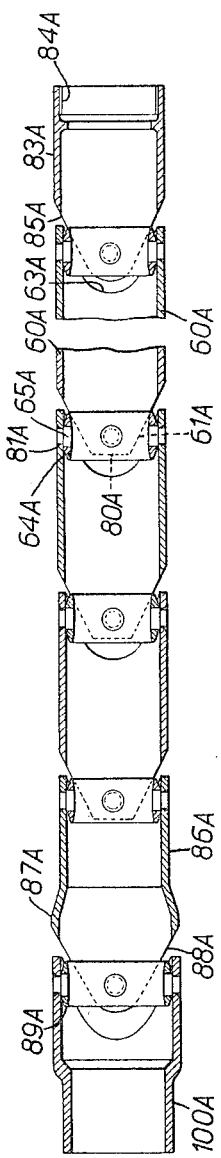

The invention may be carried into practice in various ways but one specific embodiment and a modification thereof will now be described by way of example, with reference to the accompanying drawings in which FIGURE 1 as an elevation of a fuelling machine for a nuclear reactor, FIGURE 2 is a sectional elevation on a larger scale of the upper part of the fuelling machine of FIGURE 1, showing the rotatable hoist turret, FIGURE 3 is a sectional plan of one of the hoists mounted on the turret of FIGURE 2, FIGURE 4 is a view of a length of the articulated chain of each hoist, FIGURE 5 is a detailed view on a larger scale of links of the chain of FIGURE 4, FIGURE 6 is an end view of one of the chain links as seen in the direction of the arrow VI in FIGURE 5, and FIGURE 7 is a view similar to FIGURE 4 of a modified construction of the articulated hoist chain.

In the embodiment illustrated in FIGURES 1 to 6 the invention is applied to the hoists of a fuelling machine generally indicated at 10 in FIGURE 1 for servicing the fuel element and control channels in a power-generating nuclear reactor, and comprising a lagged pressure vessel 11 mounted on a power-driven wheeled carriage 12 by which the whole machine can be driven across the charging floor 13 of the reactor. Standpipes 14 lead downwardly from apertures in the charging floor 13 to the fuel and control channels in the core of the reactor, which is mounted some distance below the charging floor 13. Inside the pressure vessel 11 is a vertical charging tube 15 at the lower end of which is a nozzle (not shown) adapted to be secured to the mouth of a selected standpipe 14 over which the fuelling machine 10 has been positioned, so that the pressure vessel 11 then constitutes an extension of the standpipe above the charging floor.

The lagged pressure vessel 11 carries vertically-spaced external platforms 16, 17 and 18 and is formed at its upper end with an enlarged turret dome 19 within which is mounted, as shown in detail in FIGURE 2, a rotatable hoist turret 20 which carries an annular hoist platform 21. The hoist turret 20 is mounted on bearings 22 and can be rotated by means of an electric motor 23 mounted on the upper external platform 18 and driving a shaft 24 via a bevel gear mechanism 25. The shaft 24 carries a driving pinion 26 which is engaged with a gear ring 27 mounted on the hoist turret 20 above its bearings 22.

Mounted on the hoist platform 21 at equal angular spacings around the charging tube 15 are four power-driven hoists 30, two of which can be seen in FIGURE 2. Each hoist 30 is associated with an overhead pulley 31 mounted on a supporting bracket 32 which is carried by the upper part 33 of the rotatable hoist turret 20, so that the articulated hoist chain 34 of each hoist 30 passes upwardly from the winding drum of the hoist over the associated pulley 31 and down into the upper end of the charging tube 15. The whole turret 20, complete with the annular platform 21 carrying the four hoists 30 and the supporting brackets 32 which carry the overhead pulleys 31, can be rotated by the turret motor 23 through successive angular steps of 90° so as to bring each of the four hoists 30 in turn into alignment with the telescopic drive shaft mechanism 36 which is driven by an electric drive motor 37 mounted on the platform 18. When a selected hoist 30 is indexed by rotation of the platform 21 into alignment with the telescopic shaft drive 36, the latter can be advanced into coupling engagement with the input shaft of the indexed hoist 30 to enable the latter to be driven by means of the motor 37. When the selected winch 30 has been indexed into this operating position, the articulated cable 34 passing from the indexed winch 30 over its associated overhead pulley 31 will extend vertically downwardly from the pulley 31 into the interior of the charging tube 15 in alignment with the charging axis 38 of the fuelling machine. It will be observed that the charging axis 38, which is in alignment with the nozzle (not shown) at the lower end of the charging tube 15, is offset from the vertical axis of rotation 30 of the turret 20.

Thus any one of the four hoists 30 can be indexed by rotation of the turret 20 by the motor 23 into an operative position in which the indexed hoist can be coupled to the driving motor 37 and can be operated to lower a load suspended from its articulated chain 34 down through the nozzle of the fuelling machine into the selected standpipe 14 to which the nozzle is coupled, and thence down into the associated channel of the reactor core, and similarly the hoist can be used to raise a load from the reactor core channel up through the standpipe 14 into the charging tube 15 of the fuelling machine 10. The fuelling machine 10 is provided with a magazine (not shown) in the lower part of its pressure vessel 11 to receive and store loads such as fuel element clusters removed from the reactor core.

FIGURE 3 shows in detail one of the four hoists 30, which is provided with a winding drum 41 formed with an external helical groove on which can be wound the articulated chain 34 of the hoist. The grooved winding drum 41 is carried by a rotary cylinder 42 which is journalled by means of bearings 43 on a fixed central spindle 44 and carries a worm wheel 45 in meshing engagement with a worm (not shown) on the input shaft of the winch to which the telescopic transmission drive 36 is adapted to be coupled. The winding drum 41 is axially movable along the rotary cylinder 42, and is keyed to the cylinder 42 for rotation therewith by means of a key 46 which extends through a longitudinal slot 47 in the wall of the cylinder 42. The key 46 is bolted to a sleeve 48 formed with an internal spiral groove 49 and the sleeve 48 is itself keyed by a recirculating ball mechanism to a cooperating spiral groove 50 formed on the fixed spindle 44. The pitch of the recirculating ball mechanism afforded by the grooves 49 and 50 and the balls trapped between them is equal to that of the spiral groove formed on the exterior of the winding drum 41 to receive the articulated chain 34, so that as the cylinder 42 is rotated by the driven worm wheel 45 and rotates the winding drum 41 by virtue of the engagement of the key 46 in the slot 47, the winding drum 41 will be advanced axially along the rotating cylinder 42 by the recirculating ball connection at a speed such that the take-off point of the chain 34 from the winding drum 41 remains stationary and in alignment with the associated overhead pulley 31, to allow the accurate and unimpeded winding of the chain 34 onto and off the winding drum 41. At one end of the rotary cylinder 42 the coaxial worm wheel 45 is enclosed in an end housing 51 into which the hoist input shaft carrying the driving worm extends. At the other end of the winch 30 the rotary cylinder 42 is provided with a braking mechanism generally indicated at 52, to enable the hoist 30 to be braked.

The articulated hoist chain 34 which is wound on the winding drum 41 of each hoist 30 is made up, as shown in FIGURES 4 to 6, of a series of rigid tubular links 60 each of which comprises a short length of cylindrical metal tube. At each end of each tubular link 60, two axially-protruding tapering noses 67 are formed as continuations of the side wall of the link 60 on diametrically-opposite sides of that end of the link, each nose 61 having a smoothly-rounded outer end. The two noses 61 at each end of each link 60 are formed by machining re-entrant recesses 63 in the intervening parts of the side wall of the link, the machining operations being performed by a milling or planing machine operating in cutting planes oblique to the axis of the link and on each side thereof, so that on each flank of the link the adjacent sides of the two noses 61 formed thereby, (which sides also constitute the edges of the intervening re-entrant recess 63 on that flank of the link) lie in a common plane corresponding to the oblique cutting plane of the machining operation, which is inclined at about 30° to the axis of the link.

In this way the re-entrant recesses 63 are formed as bays between the adjacent protruding noses 61, each of the recesses 63 being somewhat wider at its rounded base than is the round outer end of either of the noses 61. The noses 61 at one end of each link 60 are displaced at about 90° about the axis of the link with respect to the noses 61 on the other end of that link, and are thus in line with the re-entrant bays 63 at the other end of the same link.

The links are connected together to form an articulated, generally tubular chain 34 by means of gimbal rings 63 and pivot screws 65. As shown in detail in FIGURE 5, the two protruding noses 61 at one end of one link 60 are pivotally connected by means of two pivot screws 65 to diametrically-opposite points of a gimbal ring 64 which is a close fit between the noses 61, and the oppositely-directed noses 61 of the adjacent end of the adjacent link 60 are similarly pivoted by pivot screws 65 to diametrically-opposite points of the same gimbal ring 64 which are angularly midway between the first-mentioned pair of pivot points. In this way the noses 61 of one link protrude into the re-entrant recesses 63 of the adjacent link, but since the recesses 63 are wider than the noses 61 there is adequate clearance to allow relative pivotal movement between the gimbal ring 64 and each of the two links 60 that are pivoted to it, about the respective transverse pivotal axes 66 and 67 of the two pairs of pivot screws 65, through angles limited by the clearances in question. To allow the gimbal ring 64 to pivot within each pair of protruding noses about the transverse pivotal axes 66 or 67, the outer surface of the gimbal ring 64 is not a true cylinder but the two ends of that surface are slightly tapered in the axially outward directions as indicated at 68 in FIGURE 5, so that the gimbal ring will clear the inner surfaces of the noses 61 as it pivots within the noses.

The links 60 may be made of mild steel or of case-hardening material, or some of each, and whilst their dimensions may vary in accordance with the particular application, in a typical example each link 60 is made of 14 S.W.G. tube 1.625 inches in external diameter and of overall length 2.99 inches. The distance between the pivotal axes 66 and 67 of the pairs of noses 61 at opposite ends of each link is 2.35 inches, and the rounded tip of each nose 61 is of 0.32 inch radius, centered on the pivotal axis of the nose where a ¼ inch hole is bored to receive the head of a pivot screw 65. The axial length of the main part of each nose, measured between the centre of its pivot hole and a transverse plane touching the bottoms of the two adjacent re-entrant bays 63, is 0.82 inch, giving an angle of 28° as the angle of obliquity of the plane of the curved edge of each re-entrant bay 63 with respect to the axis of the link 60.

Each gimbal ring 64 is formed from a short section of cylindrical steel tubing 1.10 inches in internal diameter and 0.625 inch in axial length. The maximum external diameter of the gimbal ring is 1.455 inches, reducing to 1.450 at its two extreme edges, and the angle of taper of each of its frusto-conical ends is 10°. The gimbal ring 64 is formed with four tapped holes distributed at 90° spacings around its circumference to receive the four pivot screws 65 by which the two adjacent links are pivotally attached to it.

The hoist chain 34 is made up of 478 tubular links 60 together with appropriate end fittings to a total length of about 120 feet, and is used as a hoist suspension chain for the purpose of lowering and raising objects such as television cameras, grabs, fuel elements, flux scanning devices, control rods etc., into and out of the vertical channels in the reactor core. The chain 34 may be designed with a breaking load of 65 tons and a minimum radius of articulation of 12 inches. so that it may be wound around a winding drum 41 or pulley 31 of effective diameter in excess of two feet, or may be taken past or through a curved guide or passage of corresponding minimum radius of curvature. Electric leads and cables, flexible pipes and hoses, and/or flexible drives and the like, extend through the central passage afforded by aligned bores 70 of the links 60 and through the bores 71 of the gimbal rings 64 for connection to the particular load to be suspended at the lower end of the chain, and when the chain is wound on and off the hoist drum 41 with the flexible leads etc. housed in its interior it will effectively protect them from any risk of damage due to crushing under the forces imposed by the load on the chain. For example, as illustrated in FIGURE 6, the chain may contain a 10-core electric supply cable 73, two pairs of electric leads 74 for connection to thermo-couples, and two flexible pipe lines 75 and 76 for the passage of compressed carbon dioxide gas for cooling or pneumatic drive purposes.

FIGURE 7 shows a slgihtly modified construction of the articulated chains for the hoists 30, the same reference numerals being used as in the preceding embodiment but in conjunction with the suffix A. In this embodiment it will be observed that the axially-protruding noses 61A of each link 60A, instead of being smoothly rounded at their ends, are cut off square as indicated at 80A, but the re-entrant bays 63A still have smoothly curved concave bases. The pivot pins 65A by which the links 60A are secured to the rings 64A are welded as shown at 81A to the walls of the links 60A instead of being secured by screw-threaded connections. At its upper end the chain is provided with a special top end sleeve 83A having an internally screw-threaded end bore 84A for connection to an appropriate anchorage on the winding drum of the hoist. This top end sleeve 83A is provided with axially protruding noses 85A having round ends which are secured to the uppermost standard link 60A in the manner previously described. To the lowermost standard link 60A of the chain there is secured a special bottom end connection link 86A having a belled lower end 87A from which protrude two noses 88A having smoothly rounded ends. These noses 88A are coupled by means of an enlarged gimbal ring 89A to a special bottom end sleeve 100A for connection to a load to be suspended from the chain.

In other respects the chain illustrated in FIGURE 7 is similar to that illustrated in FIGURES 4 to 6 and is used to contain the flexible service leads leading from the associated hoist 30 to the load to be lifted by means of the chain into or out of the core of the reactor.

What I claim as my invention and desire to secure by Letters Patent is:

1. An elongated suspension means comprising in combination an articulated chain comprising a series of rigid open-ended tubular links pivotally interconnected in alignment with one another by means of universal-joint connections which permit each link to pivot through a limited angle relatively to the adjacent link about two transverse pivotal axes, and a number of flexible service leads extending through the aligned interiors of the tubular links from end to end of the chain, each link of the chain comprising a short open-ended length of rigid tube which is formed at each end with two axially-protruding tapering nose portion extending as continuations of its side wall on diametrically-opposite sides thereof, the protruding nose portions at each end being separated by corresponding re-entrant bays formed in intervening diametrically-opposite parts of the side wall, and the two pairs of nose portions at the oppsite ends of each link being angularly displaced by 90° with respect to one another around the longitudinal axis of the link, and adjacent ends of adjacent links being coupled together with the noses of one protruding into the re-entrant bays of the other by means of a gimbal ring to which the oppositely-directed noses of the two links are pivoted about transverse axes at right angles to one another.

2. In a hoist having a power-driven rotary winding drum, an elongated suspension means connected to the drum to be wound thereon and unwound therefrom in response to rotation of the drum in opposite directions respectively, said suspension means having a free end portion depending from the drum to support a suspended object, the said suspension means comprising in combination an articulated chain comprising a series of rigid open-ended tubular links pivotally interconnected in alignment with one another by means of universal-joint connections which permit each link to pivot through a limited angle relatively to the adjacent link about two transverse pivotal axes, and a number of flexible service leads extending through the aligned interiors of the tubular links from end to end of the chain for connection to said suspended object and to be wound on and unwound from the winding drum with the chain, said chain enclosing and protecting said service leads from crushing incident to winding of said chain and service leads about the drum.

3. A suspension means for a hoist having a power-driven rotary winding drum, said suspension means being connected to the drum for winding thereon and unwinding therefrom incident to rotation of the drum in opposite directions, the said suspension means comprising in combination an articulated chain comprising a series of rigid open-ended tubular links pivotally interconnected in alignment with one another by means of universal joint connections which permit each link to pivot through a limited angle relative to the adjacent link about two transverse pivotal axes, and a number of flexible service leads extending through the aligned interiors of the tubular links from end to end of the chain for connection to an object suspended by the chain, each link of the chain comprises a short open-ended length of rigid tube which is formed at each end with two axially-protruding tapering nose portions extending as continuations of its side wall on diametrically-opposite sides thereof, the protruding nose portions at each end being separated by corresponding re-entrant bays formed in intervening diametrically-opposite parts of the side wall, and the two pairs of nose portions at the opposite ends of each link being angularly displaced by 90° with respect to one another around the longitudinal axis of the link, and adjacent ends of adjacent links being coupled together with the noses of one protruding into the re-entrant bays of the other by means of a gimbal ring to which the oppositely-directed noses of the two links are pivoted about transverse axes at right angles to one another.

4. In a fuelling machine for servicing vertical channels in the core of a nuclear reactor, said machine including at least one hoist having a power-driven winding drum and an elongated suspension means connected to the drum to be wound onto and unwound therefrom in response to rotation of the drum in opposite directions and having a free end depending from the drum for connection to a suspended object, the improvement in accordance with which said suspension means comprises in combination an articulated chain comprising a series of rigid open-ended tubular links pivotally interconnected in alignment with one another by means of universal-joint connections which permit each link to pivot through a limited angle relatively to the adjacent link about two transverse pivotal axes, and a number of flexible service leads extending through the aligned interiors of the tubular links from end to end of the chain for winding and unwinding with the chain, said chain links forming a protective sheathing around the said service leads to prevent damage to said leads by crushing.

5. A suspension means for a fuelling machine for servicing vertical channels in the core of a nuclear reactor, which includes at least one hoist having a power-driven winding drum, said elongated suspension means being wound on the drum, said suspension means comprising an articulated chain including a series of rigid open-ended tubular links pivotally interconnected in alignment with one another by means of universal joint connections which permit each link to pivot through a limited angle relatively to the adjacent link about two transverse pivotal axes, and a number of flexible service leads extending through the aligned interiors of the tubular links from end to end of the chain, each link of the suspension chain comprising a short open-ended length of rigid tube which is formed at each end with two axially-protruding tapering nose portions extending as continuations of its side wall on diametrically-opposite sides thereof, the protruding nose portions at each end being separated by corresponding re-entrant bays formed in intervening diametrically-opposite parts of the side wall, and the two pairs of nose portions at the opposite ends of each link being angularly displaced by 90° with respect to one another around the longitudinal axis of the link, and adjacent ends of adjacent links being coupled together with the noses of one protruding into the re-entrant bays of the other by means of a gimbal ring to which the oppositely-directed noses of the two links are pivoted about transverse axes at right angles to one another.

References Cited by the Examiner

UNITED STATES PATENTS

| Re. 25,163 | 4/1962 | Manne | 59—80 |
| 1,828,476 | 10/1931 | Seidman | 59—80 |
| 2,904,356 | 9/1959 | Love | 285—265 |
| 2,936,185 | 5/1960 | Olsen | 285—265 |
| 3,116,050 | 12/1963 | Herrmann | 254—175.7 |
| 3,168,287 | 2/1965 | Parola | 254—175.7 |

CHARLES W. LANHAM, *Primary Examiner.*

G. P. CROSBY, *Assistant Examiner.*